May 14, 1963 J. T. DUNBECK 3,089,506
STOPCOCK ASSEMBLY
Original Filed Aug. 26, 1959
Fig. 1
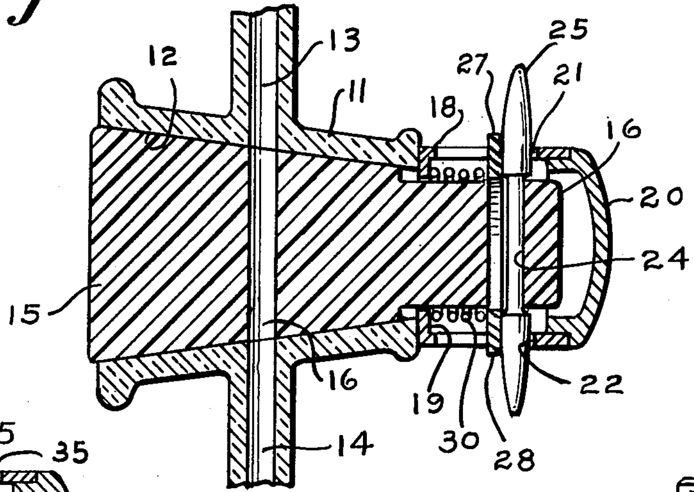
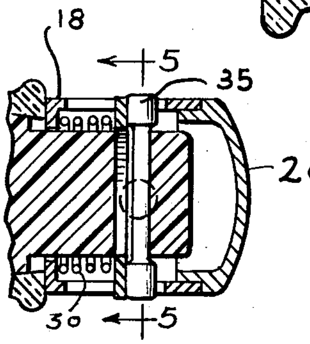
Fig. 4
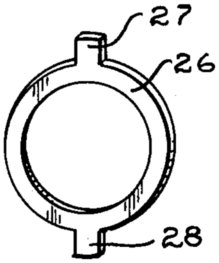
Fig. 3
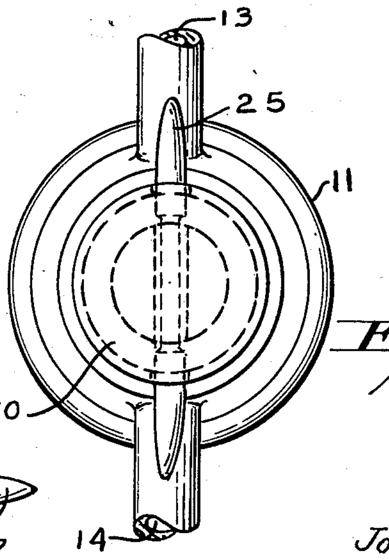
Fig. 2
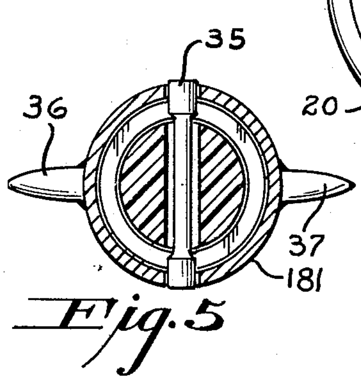
Fig. 5
INVENTOR.
JOSEPH T. DUNBECK
BY Clarence R. Patty, Jr.
ATTORNEY United States Patent Office 3,089,506
Patented May 14, 1963

3,089,506
STOPCOCK ASSEMBLY

Joseph T. Dunbeck, Corning, N.Y., assignor to Corning Glass Works, Corning, N.Y., a corporation of New York Continuation of application Ser. No. 836,245, Aug 26, 1959. This application Mar. 28, 1961, Ser. No. 98,852
2 Claims. (Cl. 137—315)

The present invention relates to stopcocks and is particularly concerned with improvements in stopcocks of the type wherein facilities are provided for maintaining the tapered plug of a stopcock resiliently seated in the similarly tapered bore of the stopcock body and is a continuation of application Serial No. 836,245, filed August 26, 1959, now abandoned.

According to one form of the invention, the stopcock plug has a handle which passes through a transverse passage in a portion thereof extending through the small end of the body. A spring arranged about such plug portion between the handle and the stopcock body is partly compressed to maintain the plug resiliently seated. The spring and the plug portion are confined within a capped cylindrical member having slot shaped passages aligned with the plug passage through which the handle passes. Also, the handle is so shaped that, through the cooperative action of the spring and plug portion, any tendency for it to be inadvertently displaced endwise is prevented. The open end of the member has an inturned flange that serves as a thrust washer between the end of the stopcock body and the spring. As a convenience in compressing the spring, preparatory to passing the handle through the aligned member and plug passages, a washer is arranged within the cylindrical member about the plug portion following the arrangement of the spring thereabout, and is provided with tabs which are passed through the member passages and are thus made available for manual manipulation to compress such spring to facilitate passing of the handle through the aligned plug and member slots. The arrangement is such that all danger of inadvertent disengagement of the plug from its seat during manipulation of its handle or through seizure of the capped cylindrical member is entirely obviated, since such disengagement can only be effected by forcing the plug handle alone toward the stopcock body.

According to the alternative form of the invention a pin of a length corresponding to the dimension of the outside diameter of the member resiliently holds the plug seated making it impossible to inadvertently disengage the plug from its seat thereby. Handles, fixed directly to the member are used to turn the plug.

For a better understanding of the invention the preferred forms thereof will now be described with reference to the accompanying drawing wherein:

FIG. 1 is an axial section of a stopcock assembly embodying the invention.

FIG. 2 is a top plan view of the assembly.

FIG. 3 is a perspective view of a special washer of the assembly.

FIG. 4 is a sectional view, similar to FIG. 1, of a fragment of the stopcock illustrating an alternative form of the invention.

FIG. 5 is a view taken on line 5—5 of FIG. 4.

Referring to the drawing in detail, the stopcock comprises a glass body 11 having tapered bore wall 12 and provided with the usual aligned transverse fluid conducting passages 13 and 14.

The plug 15 as illustrated comprises synthetic resin and is provided with the usual transverse passage 16 positioned for alignment with passages 13 and 14 by appropriate turning of the plug on its seat.

Plug 15 has a cylindrical portion 16 projecting from the bore of the small end of body 11 and is provided with a passage 24 therethrough for accommodating a handle 25. As will be observed, the end regions of handle 25 are of greater diameter than its central region and tend to prevent unintended endwise movement of the handle. Arranged about and fully enclosing plug portion 16 is a cylindrical member 18 having at one end an inturned flange 19 abutted against the small end of body 11 and at the other end provided with a cap 20. Aligned passages 21 and 22 through the wall of member 18 are also occupied by handle 25.

The member 18 and its cap 20 are preferably composed of nylon although they may be of metal, as shown, with the cap press fitted into the bore of the member. A spring 30, partly compressed between the flange 19 and handle 25, maintains the plug resiliently seated on the bore wall 12.

A washer 26 arranged about plug portion 16 between the handle 25 and the adjacent end of spring 30 is provided with tabs 27 and 28 passing through the passages 21 and 22 making such tabs readily seizable for the purpose of compressing spring 30 to facilitate passage of the handle 25 through the plug and member passages.

In the alternative form of the invention illustrated in FIGS. 4 and 5 a pin 35 of a length corresponding to the outside diameter of member 18 replaces the handle 25 and handles 36 and 37 directly connected to such member which, with the handles 36 and 37 attached thereto, is designated 181 in FIG. 5. In this form of the invention the plug passage corresponding to passage 16 is preferably parallel to the handles 36 and 37 so that when such handles are parallel with passages 13 and 14 it will be known that the plug passage is in alignment therewith, as is the case when handle 25 is in a corresponding position.

The preferred method of assembly either form of stopcock is to arrange the spring 30 and washer 26 within the member 18 and to then press the cap 20 thereon. The sub-assembly so formed can be placed about the plug portion 16 in the position shown, and the spring 30 compressed by means of the washer 26 while handle 25 or pin 35 is being passed through the passages 21, 24, and 22, respectively. The passages 21 and 22 transversely, are only of a width essential to the receipt of the handle, but have a linear dimension parallel to the plug axis which affords space for facilitating placement of the washer 26 within the member for permitting the handle or pin to move with the plug to compensate for dimensional changes resulting from temperature variations.

What is claimed is:

1. A stopcock including a body having an elongated tapered internal bore, said bore having an axial open opposite end and said body having oppositely disposed transverse passages intermediate its ends directly communicating with its tapered bore, an externally tapered plug member rotatably seatable in the bore of said body, said plug member having a transverse passage alignable with such transverse passages and having a portion extending a substantial distance beyond the small open end of said body having a transverse passage therethrough, a hollow cylindrical member encircling such portion having an inwardly flanged open end seated upon the end of the body through which such portion extends and having aligned transverse oppositely disposed passages therethrough in register with the transverse passage through the plug portion, a pin passing through the passages of such plug portion and cylindrical member respectively, a compression spring partly compressed between the flange of said cylindrical member and said pin and a washer interposed between said spring and said pin having tabs available through the cylindrical member passages for seizure to compress said spring to facilitate passage of said pin through the plug and cylindrical member passages respectively.

2. A stopcock including a body having an elongated tapered internal bore, said bore having an axial open opposite end and said body having oppositely disposed transverse passages intermediate its ends directly communicating with its tapered bore, an externally tapered plug member rotatably seatable in the bore of said body, said plug member having a transverse passage alignable with such transverse passages and having a portion extending a substantial distance beyond the small open end of said body having a transverse passage therethrough, a hollow cylindrical member encircling such portion having an inwardly flanged open end seated upon the end of the body through which such portion extends and having aligned transverse oppositely disposed passages therethrough in register with the transverse passage through the plug portion, a pin passing through the passages of such plug portion and cylindrical member respectively, and a compression spring partly compressed between the flange of said cylindrical member and said pin.

References Cited in the file of this patent

UNITED STATES PATENTS

| | | |
|---|---|---|
| 1,199,684 | Forbes | Sept. 26, 1916 |
| 1,344,364 | Vis | June 22, 1920 |
| 2,785,874 | Drow | Mar. 19, 1957 |

FOREIGN PATENTS

| | | |
|---|---|---|
| 149,382 | Great Britain | 1920 |